US006659344B2

(12) United States Patent
Otto et al.

(10) Patent No.: US 6,659,344 B2
(45) Date of Patent: Dec. 9, 2003

(54) AUTOMATED MONITORING OF ACTIVITY OF SHOPPERS IN A MARKET

(75) Inventors: Jerome A. Otto, Centerville, OH (US); Dennis J. Seitz, Dayton, OH (US)

(73) Assignee: NCR Corporation, Dayton, OH (US)

( * ) Notice: Subject to any disclaimer, the term of this patent is extended or adjusted under 35 U.S.C. 154(b) by 310 days.

(21) Appl. No.: 09/731,083

(22) Filed: Dec. 6, 2000

(65) Prior Publication Data

US 2002/0113123 A1 Aug. 22, 2002

(51) Int. Cl.$^7$ ................................................. G06F 7/08
(52) U.S. Cl. .................. 235/381; 235/383; 235/385; 705/22; 705/28
(58) Field of Search ............................... 235/381, 383, 235/385, 375, 376, 384; 705/22, 28

(56) References Cited

U.S. PATENT DOCUMENTS

| 5,294,781 | A | * | 3/1994 | Takahashi et al. | ............ | 235/376 |
| 5,295,064 | A | * | 3/1994 | Malec et al. | ................ | 340/5.91 |
| 5,418,354 | A | * | 5/1995 | Halling et al. | ................ | 186/28 |
| 5,572,653 | A | * | 11/1996 | DeTemple et al. | .......... | 235/383 |
| 5,729,697 | A | * | 3/1998 | Schkolnick et al. | ........ | 235/383 |
| 5,739,513 | A | * | 4/1998 | Watanabe | .................... | 186/61 |
| 5,793,030 | A | * | 8/1998 | Kelly, Jr. | ..................... | 235/383 |
| 6,092,725 | A | * | 7/2000 | Swartz et al. | ................ | 235/380 |
| 6,102,162 | A | * | 8/2000 | Teicher | ........................ | 186/39 |
| 6,327,576 | B1 | * | 12/2001 | Ogasawara | .................. | 705/22 |

* cited by examiner

Primary Examiner—Michael G. Lee
Assistant Examiner—Seung H. Lee
(74) Attorney, Agent, or Firm—NCR Corporation; James M. Stover

(57) ABSTRACT

A system for gathering data on behavior of shoppers in a retail market. A scanner is attached to a shopping basket, and detects (1) removal of an item from a shelf, (2) the identity of the removed item, (3) insertion of an item into a shopping basket, which may be the identical item removed from the shelf, and (4) the identity of the inserted item. Repeated detection of this type of data for numerous items, and numerous shoppers, allows one to draw valuable inferences about the shoppers, such as how often comparison shopping occurs. This type of detection also allows one to take specific responses to the actions of the shoppers.

10 Claims, 5 Drawing Sheets

AUTOMATED MONITORING OF ACTIVITY OF SHOPPERS IN A MARKET

The invention concerns a system for automated monitoring of items selected by shoppers in a market, and also detection of whether the items are placed into a shopping basket. Such monitoring on a large scale allows one to draw valuable inferences about the behavior of large numbers of shoppers.

BACKGROUND OF THE INVENTION

Radio Frequency Identification Devices, RFIDs, are commercially available. They store data, and, when interrogated by a scanner located in the vicinity of the RFID, transmit the data to the scanner.

RFIDs are sometimes used as labels for products, and, in this capacity, are somewhat analogous to Uniform Product Code (UPC) labels, which are the familiar "bar code labels." That is, the RFIDs are attached to items in a retail market. Each RFID contains data which identifies its item: for example, that data may contain the UPC number of the item. A shopper selects items for purchase, and delivers them at a check-out station. At the station, an RFID scanner interrogates the items, and ascertains from the RFIDs (1) the identity of each item and then (2) the price.

One advantage of using the RFIDs is that items need not be individually presented to a scanner. The scanner can poll the RFIDs present in a shopping basket as a group.

The invention provides an additional use for the RFIDs.

OBJECTS OF THE INVENTION

An object of the invention is to provide an improved RFID.

A further object of the invention is to provide an improved method of operating a retail market.

A further object of the invention is to provide a shopping basket having an RFID scanner attached, for taking inventory of items within the basket.

A further object of the invention is to provide a shopping basket having an RFID scanner attached, for identifying items removed from a nearby shelf.

SUMMARY OF THE INVENTION

In one form of the invention, an RFID is used for two purposes. One is to identify a product for pricing at a check-out station. A second is to identify a product at the time when it is removed from a shelf in the market, independent of the check-out process.

One purpose of the second identification is to collect data on customer behavior, for the benefit of the owner of the market, and the manufacturer of the items.

In another form of the invention, a third use of the RFID is to identify a product placed into a shopping basket, again independent of the check-out process, for further data gathering.

DETAILED DESCRIPTION OF THE INVENTION

The operation of the invention can be divided into two parts: (1) observation of customer behavior and (2) responding to the observed behavior, as by (A) offering prompts to the customer, or (B) predicting subsequent behavior and formulating a suitable response. This Specification will describe those two parts, and then discuss equipment utilized to implement the actions described.

Observation of Behavior

Figure 1:
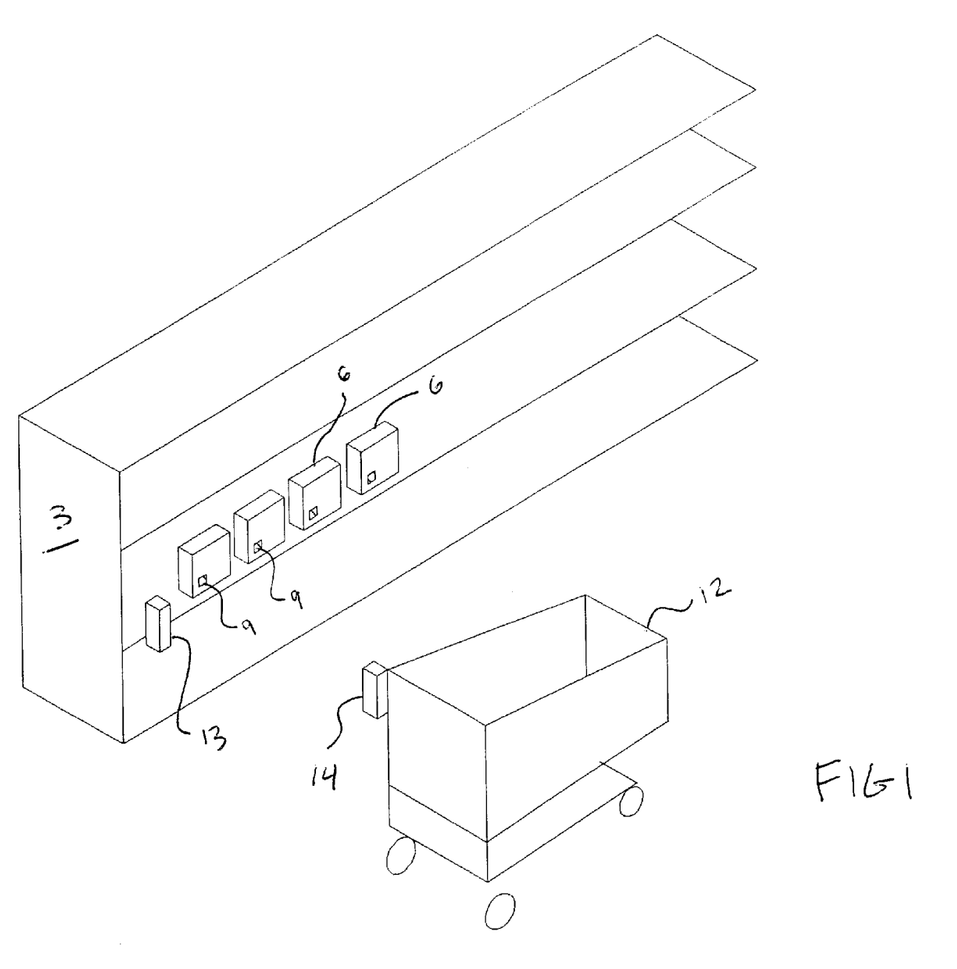
FIG. 1 illustrates shelves in a retail market, with items of merchandise thereon.

FIG. 1 illustrates one form of the invention. Shelves 3 represent merchandise displays in a supermarket, or other retail merchandise outlet. Items 6 represent the merchandise for sale. Each carries a device 9, described later in more detail, which facilitates operation of the invention. A shopper (not shown) drives a shopping basket 12, into which the shopper places items which are selected from the shelves 3.

The invention includes a system, which can include a (1) stationary device 13, which is attached to the shelves 3 or a mast (not shown) upstanding from the floor, or (2) a mobile device 14, which is attached to the basket 12, and which performs the same general operations as the stationary device 13, or (3) both the stationary and mobile devices 13 and 14.

The invention monitors the items 6. The invention determines whether each item 6 is located in one of three positions, namely, (1) in the basket 12, (2) on shelves 3, or (3) neither in the basket 12 nor on the shelves 3.

For example, an item 6 may take the form of Brand X canned corn. If the shopper removes a can of Brand X corn from a shelf, and holds the can in the hand, the invention will detect that a can of brand X corn has been removed from the shelf, and also that the can is not in the basket 12. The inference may be raised that the can is held in the hand of the shopper at that time.

As another example, if the shopper then places the can into the basket 12, the invention ascertains that fact, and thereby ascertains that the can is positioned in the basket 12, and is not on the shelf.

The data just obtained is recorded. Multiple approaches exist for recording the data. In one approach, a detailed record of the successive occupations of positions (1), (2), or (3) by the item can be recorded, together with the time-of-day for each position. For instance, the invention can derive the following Table 1 for the events just described.

TABLE 1

| Time of Day | Item | Location |
| --- | --- | --- |
| 10:00:00 am | X corn | Shelf |
| 10:05:00 am | X corn | Not shelf, not basket |
| 10:05:10 am | X corn | Basket |

This Table records the events just described. As the Table indicates, the can of Brand X corn stood on its shelf until 10:05:00, at which time it was then neither located on its shelf nor in a basket. Presumably, at this time, it was in the hand of a customer. Then, at 10:05:10, the can was found in the basket.

While this particular Table is exemplary, and contains a small amount of information, this type of information can provide valuable information to the operator of the market. For instance, the very short time duration during which the location of the can of corn was unknown, namely, ten seconds, raises the inference that the customer removed the can from the shelf, and directly placed it into the basket 12. This customer probably did not spend any time in making a decision over the purchase.

However, if the time of "10:05:10" in the Table was instead found to be "10:10," it may be inferred that the customer spent time examining the can, as by reading the label. That inference, and others like it, can provide useful information to the operator of the market.

The preceding example considered a single item of merchandise. The invention in addition contemplates tracking multiple items. Tracking the additional items on a simultaneous basis allows the operator of the market to obtain additional information, of a qualitatively different kind than the information just described. For example, assume that the invention derives the following table 2, in response to detected events. Two different items were tracked, Brand X corn and Brand Z corn.

TABLE 2

| Time of Day | Item | Location |
| --- | --- | --- |
| 10:00 am | X corn | Shelf |
| 10:00 am | Z corn | Shelf |
| 10:05:30 am | X corn | Not shelf, not basket |
| 10:05:35 am | Z corn | Not shelf, not basket |
| 10:07:30 am | X corn | Shelf |
| 10:07:40 am | Z corn | Basket |

This Table leads to the inference that the customer (1) examined both a can of Brand X corn and a can of Brand Z corn, as by reading the labels, (2) rejected the Brand X corn, and (3) accepted the Brand Z corn.

It is emphasized that the invention is not designed to guarantee the accuracy of the inferences, but, instead, to gather information upon which the inferences are based. For example, a situation can be envisioned wherein the inference made above is incorrect. A small child accompanying the customer may have selected the can of Brand X corn, and the customer may have returned that can to the shelf, without any analysis of the label of the can of Brand X corn, because Brand Z corn is preferred. It is emphasized that the invention gathers the data, and a human operator makes inferences based on the data.

In addition, the table can contain other data. It was stated above that the invention determines whether each item is located in one of three positions, namely, (1) in the basket 12, (2) on shelves 3, or (3) neither in the basket 12 nor on the shelves 3. If, in the case of Table 1, the customer later removed the can of Brand X corn from the basket, and then replaced the can on the shelf, Table 1 would contain the following information:

TABLE 1

| Time of Day | Item | Location |
| --- | --- | --- |
| 10:00 am | X corn | Shelf |
| 10:05 am | X corn | Not shelf, not basket |
| 10:06 am | X corn | Basket |
| 10:25 am | X corn | Not shelf, not basket |
| 10:25:10 am | X corn | Shelf |

Table 1 now indicates that the can of Brand X corn was removed from a shelf, placed into a basket, then removed from the basket, and returned to the shelf.

In addition to making the determination as to whether items are located in one of three places (the shelf, the basket, or neither), the invention maintains a continual inventory of the contents of the basket, using techniques described below. Thus, in addition to generating and maintaining the tables described above, the invention would progressively generate a contents-list, such as the following:

| Contents List | | |
| --- | --- | --- |
| Brand X corn | Brand A popcorn | Brand D spaghetti |
| Brand M coffee | etc. | |

The contents-list is an inventory of the contents of the customer's shopping basket 12.

Monitoring the behavior of the customer, in the manner just described, allows the invention to take the following types of responses to that behavior.

Responses to Observed Behavior

Response 1

If the observed behavior indicates that a customer selected an item, and placed it directly into the basket 12, the inference arises that the customer performed no comparison with other items. That is, if the time between (1) removal of an item from the shelf and (2) insertion into the basket 12 is less than a specific threshold, the inference is raised that no comparison shopping occurred.

The specific threshold used will be determined by the operator of the invention, and can be any integral number of seconds from zero to 60, or other value.

However, if no comparison shopping occurred, the inference is raised that the customer is not interested in competing, comparable items. However, the customer may nevertheless be interested in complementary items.

For example, if the customer purchased a premium, high-quality brand of spaghetti, the customer may be interested in a premium, high-quality type of spaghetti sauce, such as an imported sauce. Thus, the invention may prompt the customer to purchase such a sauce, as by presenting a message on a display which advertises the imported sauce.

As another example, if the customer selected canned pumpkin, the invention may prompt the customer to purchase whipped cream, or eggs, based on the assumption that the customer intends to prepare pumpkin pie.

Therefore, based on the inference that the customer performed no comparison shopping, the invention prompts the customer to purchase complementary items, as by issuing a message. Whether items are "complementary" can be determined by the operator of the market. As one example, the operator can generate a list. Every item on the list is associated with one, or more, other items. The items are selected by the operator. In this example, the operator, in effect, defines what is complementary for each item.

When the inference is raised that a customer failed to comparison-shop for a given item, that item is located on the list, and the associated (complementary) item(s) are prompted to the customer.

As another example of determining complementary items, statistical methods can be used. Historical purchasing data can be examined, and the total purchases of a large number of customers are examined. Whenever Brand X corn is found in a customer's purchases, a statistical correlation is made Brand X corn and each other item, as well as perhaps with combinations of other items. It will be found that X percent of the customers also purchased Brand K milk, Y percent purchased Brand L lima beans, etc.

In this manner a correlation can be found between each item, and every other item. Whenever the correlation is sufficiently high between two items, such as above 80 percent, or another number chosen by the operator, the two items are deemed to be complementary.

Response 2

Assume that the customer selects two (or more) items, but places neither into the basket 12, and possibly returns both to the shelves. The invention raises the inference of possible customer interest in the type of product, even though the product was not purchased. In response, the invention presents a discount-coupon for that type of product to the customer.

The coupon is preferably delivered to the customer at the check-out station (not shown), where the customer pays for the selected items. The coupon can be selected from a stock of coupons, or printed at that time.

For example, assume that the customer selects two cans of spaghetti sauce, but places neither into the basket 12. At check-out, the invention offers the customer a discount-coupon for one, or both, cans of sauce, for use at a later time.

Response 3

Assume that the customer selects two items A and B, but places item B into the basket 12. The invention raises the inference that comparison-shopping occurred. The invention notifies the manufacturer of item A of these events, as by stating the time-of-day of the selections, and any time delay between the selection of item A and the insertion of item B into the basket.

This notification can take the form of an e-mail message, transmitted using the equipment described below. Further, a single message can be transmitted which covers numerous events of the type described, over a period of time, such as eight hours. Further still, it is likely that, in some comparisons, item A will be selected over item B (which is the opposite of the selection described immediately above), and those events are reported to the manufacturer in the message also.

Response 4

Assume that an item A is placed into the basket 12, and then later removed and replaced by an item B in the same category. For example, both items may be types of tomato sauce.

The invention raises the inference that item B is preferred, but was not available or visible to the customer, at the time item A was placed into the basket 12. The inference is raised that item B should be made available at the location where A is made available.

Response 5

The location where an item is selected by the customer may provide the operator of the market with valuable information. For example, Brand A spaghetti sauce may be displayed in two locations: (1) with other spaghetti sauces in a nondescript manner and (2) in a special, lavish display unconnected with other spaghetti sauces. The operator of the market would like to know when the sauce is selected from the lavish display, in order to determine the effectiveness of the display, and to compare the effectiveness of different displays.

Equipment

The preceding modes of operation require apparatus which performs several tasks. One is to determine whether items are located in one of three places, namely, (1) in the basket 12, (2) on shelves 3, or (3) neither in the basket 12 nor on the shelves 3. Another is to determine where in the market the three-fold determination occurs. For example, if the determination is made by an apparatus affixed to the basket 12, then knowledge of the location of the basket 12 will suffice.

A third task is to determine the time-of-day of the three-fold determination. Apparatus which performs these tasks will now be described. A fourth task is to take inventory of the contents of the baskets 12.

It is emphasized that not all these tasks are necessarily required by every form of the invention.

Numerous different types of equipment exist which can accomplish these tasks. One type will be described.

Figure 2:
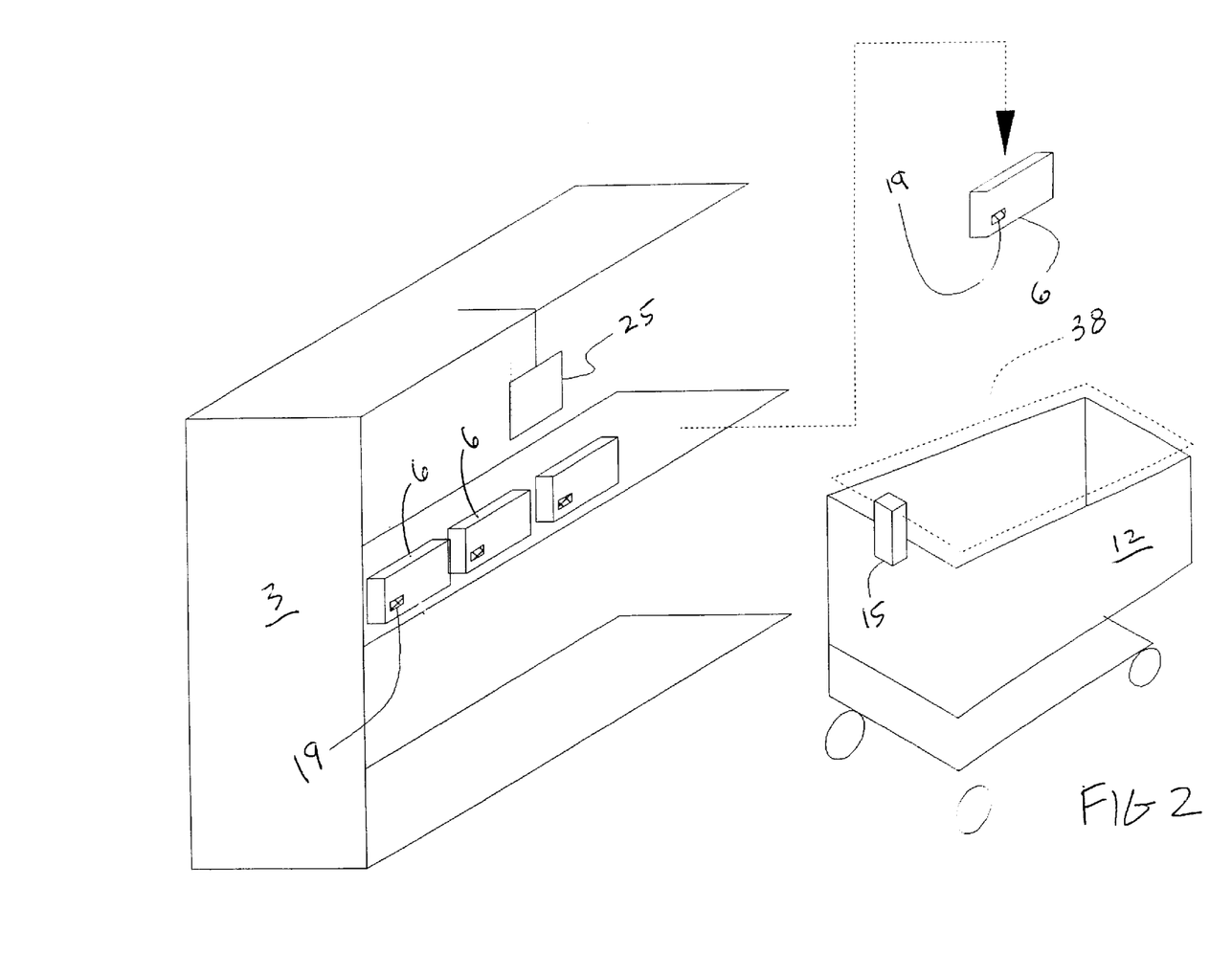
FIG. 2 illustrates a representative shelf 3 in a retail market.

FIG. 2 illustrates a representative shelf 3 in a supermarket, or other retail merchandise outlet. Items 6 of merchandise each carry an RFID transmitter 19, which contains data within memory (not separately indicated). The data within the RFID transmitter 19 acts as a label, and carries information about the product, as well as other data. The data is somewhat analogous to that encoded into the well known "bar codes, " or UPC (Universal Product Code) labels.

RFID is an acronym for Radio Frequency Identification. RFID transmitters and transceivers are commercially available, as from RFID Inc, 3538 Peoria Street, Suite 505, Aurora, Colo. 80010. As an example, a device which can store 2K bits is available in a flat package about 0.54 inch square. This device corresponds to transmitter 19.

This device can transmit data to, and receive data from, a commercially available transmitter, or scanner, located about 2–9 inches away. Other RFID devices are available which will have larger storage, and will communicate with transmitters 3 feet away, and farther.

A shopping basket 12 is shown, together with a scanner 15 of the well known RFID type, or an equivalent. The scanner 15 interrogates the RFID 19, and causes the RFID 19 to transmit the information stored within itself to the scanner 15. Scanner 15 is known in the art.

Several modes of operation of the invention are described below. Depending on the particular mode used, additional equipment may be desirable, in order to improve the accuracy of operation. However, it is emphasized that absolute accuracy is not necessarily required, because one purpose of the invention is to obtain survey-type data from populations of shoppers within retail markets.

The survey-type data is statistical in nature, and represents population statistics, rather than precise data about individual purchasers. Consequently, small errors in detecting individual purchases can be tolerated. However, as will be seen, if desired, additional equipment can be added, to reduce these small errors.

FIG. 2 illustrates some additional equipment for these purposes. One or more additional RFID scanners 25 can be positioned at fixed positions in the market, such as at various points in FIG. 3. (Points are not indicated.) The scanners 15 and 25 communicate with a central computer system, represented by server 30 in FIG. 3. Communication between the mobile scanner 15 and the stationary server 30 can be accomplished by numerous known methods, such as rf modems or cellular modems. The scanners 15 and 25 report the data which they have collected, either in real-time, in multi-plex fashion. Alternately, the scanners 15 and 25 may store the data they collect in memory until the data is read by a technician, or ordered to be transmitted by the server 30. The particular mode of data transfer from the scanners 15 and 25 to the server is not seen as significant.

In operation, scanner 15, possibly in conjunction with other of the scanners 25, will perform the following operations. One operation is to record the identities of the items of merchandise which are placed into the shopping basket 12. Plane 38 in FIG. 1 represents the field-of-view of the mobile scanner 15. In a sense, scanner 15 is equipped with a directional antenna (not shown), and plane 38 represents the primary lobe of the antenna.

When the scanner 15 detects an RFID label 19 within the scanner's field of view 38, the scanner 15 interrogates the label 19. In response, the label 19 transmits selected contents from its memory. The Inventors point out that this process occurs both when (1) a product is placed into the basket 12, and (2) a product is removed from the basket 12. That is, whenever a product enters the field-of-view 38 of the scanner 15, it is interrogated. Detection of entry by the product into the field-of-view 38 is performed by the commercially available scanner 15.

A significant feature is the selective nature of the transmission by the RFID label 19. In one form of the invention, the label 19 may contain information in addition to that identifying the product to which the label is attached. For example, that information may indicate the price of the product, the date the product was placed on the shelf, an expiration date, or other data which is of interest to various parties who handle the product. However, as stated, in one form of the invention, the only information which is transmitted to the scanner 15 is the identity of the product. In other forms, other information may be transmitted instead, or in addition.

Therefore, as products enter and leave the basket 12, they must pass through the field-of-view 38. When they do so, scanner 15 interrogates them, and records their identities. This form of the invention allows a table to be generated which indicates the identities of products which entered the field-of-view 38. In addition, as discussed below, the time-of-day of each entry can be added to the table, and the location of the scanner 15 can also be added.

Under this arrangement, very elementary data is obtained. For example, if Brand X corn is detected twice within lobe 38, the question arises whether (1) Brand X corn was placed into the basket 12 (first detection), and then removed (second detection), or (2) two cans of Brand X corn were placed into the basket. This question can be resolved by reading further identification data from the RFID.

In one approach, each item is identified by a serial number, in addition to its UPC-type code. That is, each can of Brand X corn is assigned a unique serial number, which distinguishes it from all other cans of Brand X corn. That serial number is stored within the RFID, and is transmitted to the scanner upon interrogation, along with the UPC-type identification data. This serial number will remove the ambiguity just discussed.

One approach for implementing the serial numbers is discussed in a co-pending U.S. patent application, entitled, "TIME-STAMPING OF MERCHANDISE PRIOR TO SALE," application Ser. No. 09/633,414, filed on Aug. 7, 2000, in which the Inventor is Jerome A. Otto, who is a co-inventor herein. This application is hereby incorporated by reference.

Figure 4:
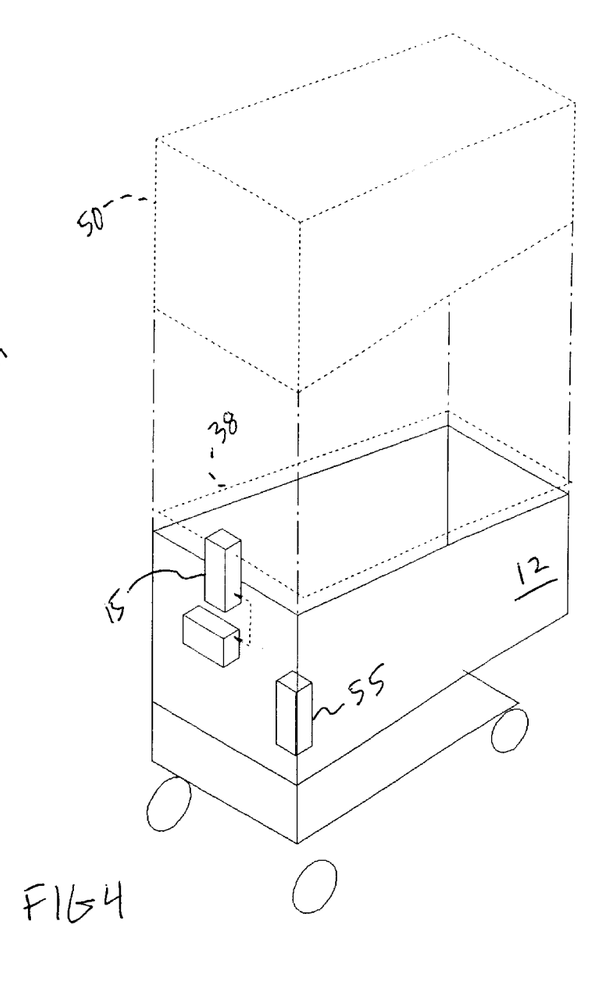
FIG. 4 illustrates a three-dimensional lobe produced by a scanner.

In another embodiment, the lobe 38 is specifically designed to be three-dimensional, and occupies, or includes, the space within the basket 12, as indicated in FIG. 4. Dashed box 50 represents the three-dimensional lobe.

In this connection, two situations are specifically set forth. One, the three-dimensional lobe 50 is produced by scanner 15. That is, scanner 15 detects any RFIDs present within the three-dimensional lobe 50. Two, the three-dimensional lobe 50 is generated by a second scanner 55, and scanner 15 generates the planar lobe 28, as discussed above.

Under the first situation, the scanner 15 will periodically poll all RFID labels within the three-dimensional lobe 50, if any, and thereby learn the identities of the products within the basket 12. The scanner 15 continually generates an inventory of the contents of the basket 12.

Under the second situation, the scanners 15 and 55 cooperatively develop a more complex report. For example, if an RFID label is first detected as present in lobe 38, and then in lobe 50, the inference is raised that the RFID label was inserted into the basket, together with the product to which it is attached.

In contrast, if the RFID label is detected in lobe 50, and then in lobe 38, the inference is raised that the RFID label was removed from the basket, together with the product to which it is attached.

In one mode of operation using two lobes, the use of serial numbers, as well as UPC-type identifying codes, for each item is specifically included. In another mode of operation, serial numbers are not used, only UPC-type identifying data is used.

The cooperation between the scanners 15 and 55 may be active, or passive. In the passive case, the scanners 15 and 55 merely record events, and the times of occurrence. Another agent, or person, will make inferences based on the data recorded. For example, if Brand X corn is found within a basket 12 at time T1, and then found absent at time T2, those two events are recorded. But the scanner itself does not reach the conclusion that Brand X corn was removed, or returned to a shelf.

In the active case, the scanners draw inferences. In the preceding example, an inventory taken at a given time is compared with the last previous inventory. If a comparison of the inventories indicates an item present in one inventory, and absent in another, a suitable inference is drawn. For example, presence of an item in a previous inventory, followed by absence in a subsequent inventory, may raise the inference of removal from the basket.

Figure 5:
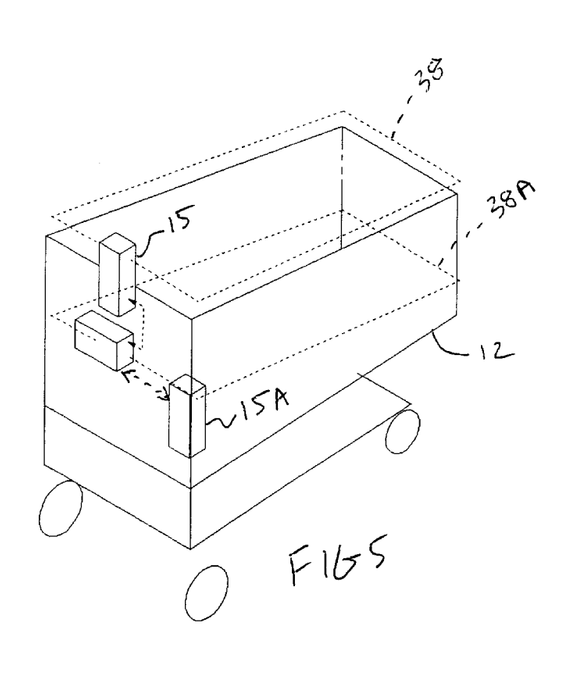
FIG. 5 illustrates a configuration of lobes which allows sequencing information to be obtained, that is, to ascertain whether an item cuts one lobe and then the other, to thereby indicate whether the item is being placed into the basket, as opposed to being removed from the basket.

In an alternate situation, two scanners 15 and 15A in FIG. 5 both generate planar lobes 38 and 38A, as opposed to one scanner generating the three-dimensional lobe 50 in FIG. 4. The timing information is obtained from the successive crossings of each lobe by an RFID label in FIG. 5.

Figure 6:
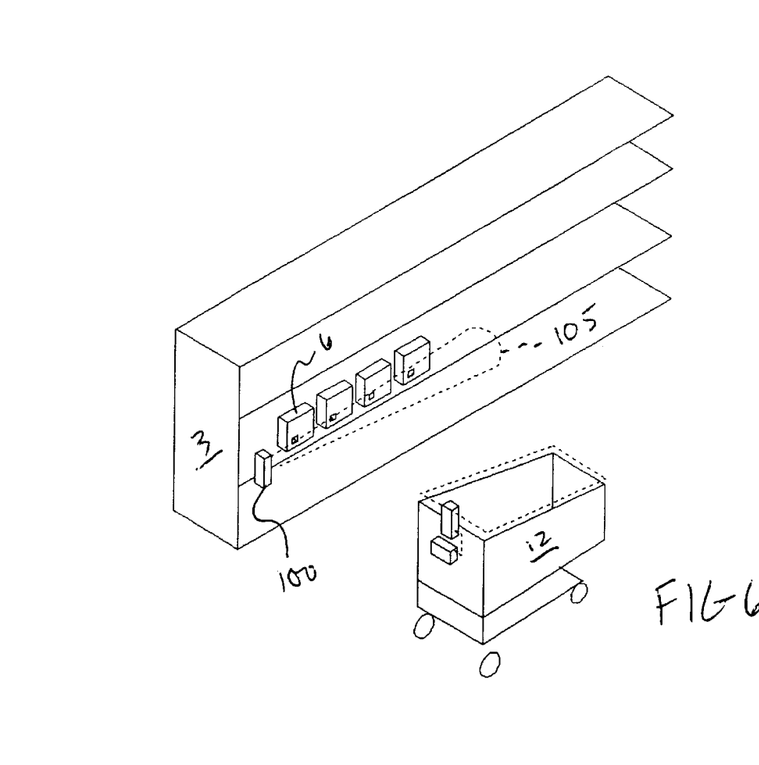
FIG. 6 illustrates additional RFID scanners positioned in a market.

Additional information can be obtained from other scanners, which are located at fixed, stationary positions, such as scanner 100 in FIG. 6. That scanner 100 interrogates RFID labels which are detected within its lobe 105, and obtains the selected information discussed above. That scanner 100 develops a table of the type discussed above, and periodically delivers the table to computer system represented by server 30 in FIG. 3.

Figure 3:
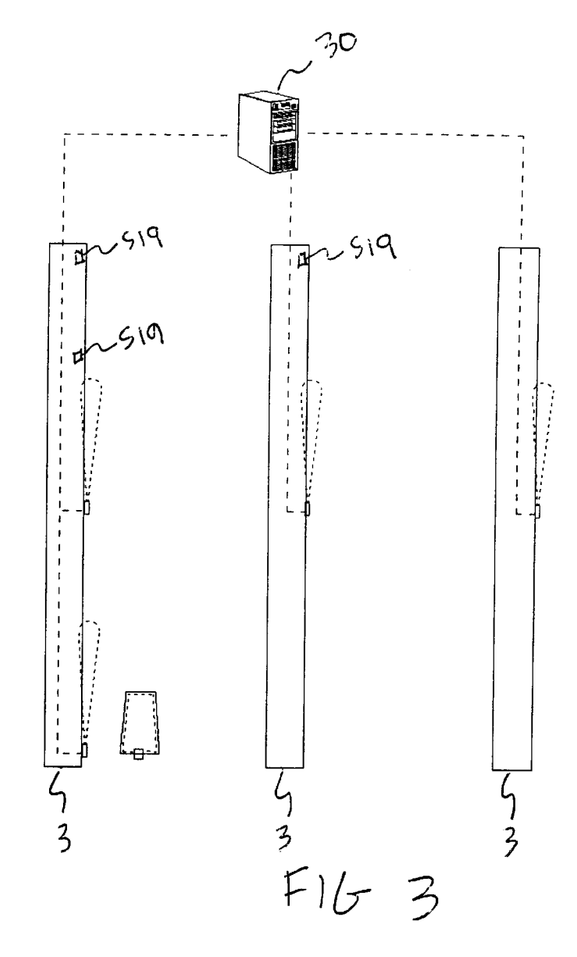
FIG. 3 illustrates a server 30 with which the scanner of FIG. 1 communicates.
Figure 7:
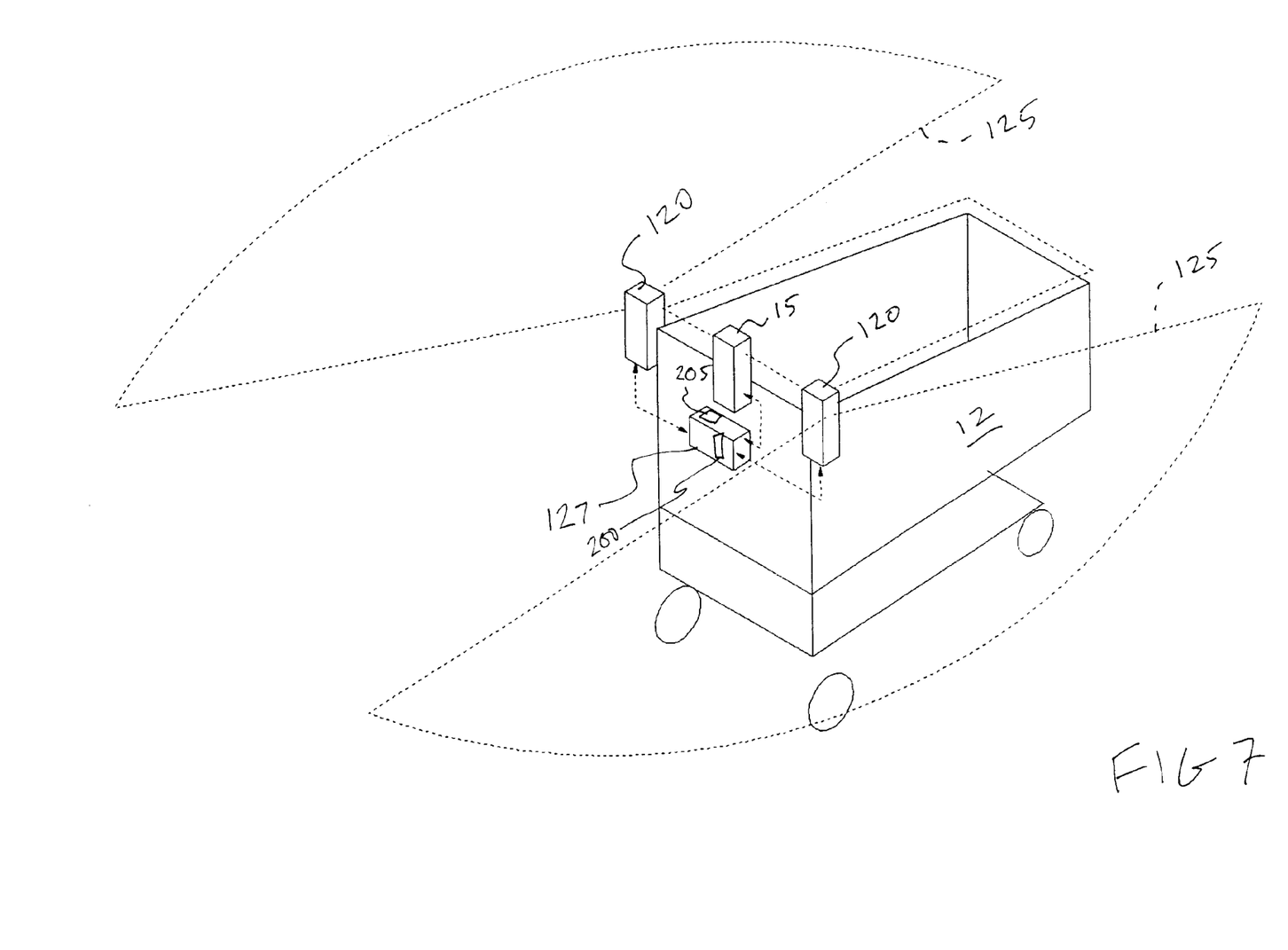
FIG. 7 illustrates RFIDs used for the purpose of indicating the position of the basket within a market.

The location of the basket 12 within the market can be inferred from stationary RFID devices, indicated as S19 in FIG. 3. Basket 12 can be equipped with a scanner 120 in FIG. 7 having lobes 125 which detect the stationary RFID devices S19. When such as device is detected, the scanner 120 interrogates it, and the device S19 responds by informing the scanner 120 of the device's position, as in Cartesian Coordinates. Block 127 in FIG. 7 represents communication equipment and, additionally, computation equipment for performing the processes described herein.

Additional equipment can be added to the scanners. As a simple example, a single-board computer 200 can receive the data from the scanner, and can issue messages through a display 205, such as an LCD display.

One suitable computer is based on the so-called "personal computer" architecture, which was developed by IBM Corporation, Armonk, N.Y. and utilizes the 8XX86 family of microprocessors, designed by INTEL Corporation, Santa Clara, Calif. This type of controller is available, for example, in the form of a single-board computer, from Octagon Systems, 6510 West 91st Avenue, Westminister, Colo.

Additional Considerations

1. The information which is transmitted from the device 9 in FIG. 1 to a scanner is not detectable by humans, in its transmitted form. For example, a human can learn to read a so-called bar code, and determine the number which the bar code represents. However, the information transmitted by the device 9 is not transmitted using a human-detectable carrier, such as visible light. Further, if visible light is used, the modulation, which carries the information, is of a type which a human cannot understand. For example, pulse modulation may be used, which is too rapid for a human to detect.

2. The basket 12 is indicated as running on wheels. Hand-held baskets, or other merchandise carriers for shoppers, can be used with the invention.

3. The discussion above indicated that RFIDs can be used as guideposts to indicate the position of a basket within a market. Alternately, the existing RFIDs on items can perform the same function. For example, a scanner on a basket may scan an item while still located on a shelf. After identifying the item, a computer may look up that item in a table, and thereby ascertain the location of the item within the market, and thus the location of the scanner which just scanned the item.

4. It is specifically emphasized that numerous different types of devices can perform the operations described herein. RFIDs and RFID scanners are taken as exemplary. Many other types of equipment can be used. For example, bar code scanners can be used, and existing UPC codes on the items can be used: a bar code scanner may be placed on the shopping basket 12. This may require cooperation of shoppers, in that the shoppers would scan each item as it is placed into the basket. The shopper may be induced to perform the scanning by a suitable discount on the purchases made.

Numerous substitutions and modifications can be undertaken without departing from the true spirit and scope of the invention. What is desired to be secured by Letters Patent is the invention as defined in the following claims.

What is claimed is:

1. A method of determining activity of a shopper comprising the steps of:

interrogating a radio frequency identification (RFID) tag on a product in a market at a plurality of times by a plurality of RFID scanners as the shopper moves the product in the market;

logging the plurality of times;

logging locations of the plurality of RFID scanners with the plurality of times to identify a product path; and determining the activity of the shopper from the plurality of times and the product path.

2. A method of determining activity of a shopper comprising the steps of:

interrogating a radio frequency identification (RFID) tag on a product in a market at a first time by a first RFID scanner;

interrogating the RFID tag at a second time by a second RFID scanner;

logging the first and second times;

logging locations of the first and second REID scanners to identify a product path; and determining the activity of the shopper from the first and second times and the product path.

3. A method of determining activity of a shopper comprising the steps of:

interrogating a radio frequency identification (RFID) tag on a product on a shelf in a market at a first time by a first RFID scanner adjacent the shelf;

interrogating the RFID tag at a second time by a second RFID scanner in a shopping cart;

logging the first and second times;

logging locations of the first and second RFID scanners to identify a product path from the shelf to the cart; and determining the activity of the shopper from the first and second times and the product path.

4. The method as recited in claim 3, further comprising the steps of:

interrogating the RFID tag at a third time on the shelf by the first RFID scanner;

logging the third time;

logging the location of the first RFID scanner to identify an extended product path from the shelf to the cart and back to the shelf; and determining the activity of the shopper from the first, second, and third times and the extended product path.

5. A method of determining activity of a shopper comprising the steps of:

interrogating a radio frequency identification (RFID) tag on a product on a shelf in a market at a first time by a first RFID scanner adjacent the shelf;

interrogating the RFID tag at a second time by a second RFID scanner in a shopping cart;

logging the first and second times;

logging locations of the first and second RFID scanners to identify a product path from the shelf to the cart;

comparing a difference time between the first and second times to a threshold difference time; and determining the activity of the shopper from the product path and a comparison of the difference time to the threshold difference time.

6. A system for determining activity of a shopper comprising:

a plurality of radio frequency identification (RFID) scanners for interrogating an RFID tag on a product in a market at a plurality of times as the shopper moves the product in the market; and a computer for logging the plurality of times, for logging locations of the plurality of RFID scanners with the plurality of times to identify a product path, and for determining the activity of the shopper from the plurality of times and the product path.

7. A system for determining activity of a shopper comprising:
   a first radio frequency identification (RFID) scanner for interrogating an RFID tag on a product in a market at a first time;
   a second RFID scanner for interrogating the RFID tag on the product at a second time; and
   a computer for logging the first and second times, for logging locations of the first and second RFID scanners to identify a product path, and for determining the activity of the shopper from the first and second times and the product path.

8. A system for determining activity of a shopper comprising:
   a first radio frequency identification (RFID) scanner for interrogating an RFID tag on a product on a shelf in a market at a first time;
   a second RFID scanner for interrogating the RFID tag on the product at a second time in a shopping cart; and
   a computer for logging the first and second times, for logging locations of the first and second RFID scanners to identify a product path from the shelf to the cart, and for determining the activity of the shopper from the first and second times and the product path.

9. The system as recited in claim 8, wherein the first RFID scanner interrogates the RFID tag at a third time on a shelf; and
   wherein the computer logs the third time, logs the location of the first RFID scanner to identify an extended product path from the shelf to the cart and back to the shelf, and determines the activity of the shopper from the first, second, and third times and the extended product path.

10. A system for determining activity of a shopper comprising:
    a first radio frequency identification (RFID) scanner for interrogating an RFID tag on a product on a shelf in a market at a first time by a first RFID scanner adjacent the shelf;
    a second RFID scanner for interrogating the RFID tag on the product at a second time in a shopping cart; and
    a computer for logging the first and second times, for logging locations of the first and second RFID scanners to identify a product path from the shelf to the cart, for comparing a difference time between the first and second times to a threshold difference, and for determining the activity of the shopper from the product path and a comparison of the difference time to the threshold difference time.

* * * * *

UNITED STATES PATENT AND TRADEMARK OFFICE
CERTIFICATE OF CORRECTION

PATENT NO. : 6,659,344 B2
DATED : December 9, 2003
INVENTOR(S) : Otto, J. A. and Seitz, D.

It is certified that error appears in the above-identified patent and that said Letters Patent is hereby corrected as shown below:

<u>Title page,</u>
Item [74], *Attorney, Agent, or Firm,* delete "NCR Corporation; James M. Stover" and insert -- Gregory A. Welte; Paul W. Martin. --

Signed and Sealed this

Fourth Day of May, 2004

JON W. DUDAS
*Acting Director of the United States Patent and Trademark Office*